United States Patent Office 3,524,747
Patented Aug. 18, 1970

3,524,747
SEASONING COMPOSITIONS AND RELATED
PRODUCTS AND METHODS
Masami O'Hara and Shizuyuki Ota, Tokyo, Hitoshi Enei and Sadanari Eguchi, Kawasaki-shi, and Shinji Okumura, Yokohama-shi, Japan, assignors to Ajinomoto Co., Inc., Tokyo, Japan
No Drawing. Filed Mar. 30, 1966, Ser. No. 538,583
Int. Cl. A23l 1/22
U.S. Cl. 99—140                                    21 Claims

ABSTRACT OF THE DISCLOSURE

A seasoning for giving a beef or meat-like flavor to foods. The seasoning includes amino acids, at least one organic acid, at least one phosphate and at least one 5'-nucleotide. The amino and organic acids can be free acids or salts of the acids or mixtures thereof. The amino acids include glutamic acid and alanine, histidine, arginine, threonine, methionine and leucine. The latter six amino acids constitute at least 30% by weight of the total amount of amino acids exclusive of glutamic acid. The organic acid is no more than three parts by weight based on the weight of the free organic acids to one part of all of the amino acids employed exclusive of the glutamic acid.

---

This invention relates to methods of imparting beef or meat-like flavors to foods. The invention also relates to novel seasoning compositions and to food products containing said novel compositions.

An object of the present invention, by way of example, is to provide novel, artifically prepared seasoning compositions by which improved or enhanced flavor is given to foods and, more particularly, by which a beef or meat-like flavor is given to foods. Illustratively, such seasoning compositions are prepared in accordance with the invention, artificially, by mixing amino acids, organic acids, phosphates, 5'-nucleotides and so forth.

In recent times, there has been a demand for seasonings capable of imparting a beef or meat-like flavor to foods. This demand has increased throughout the world, and it is expected that such demand will increase significantly in the future. However, as the supply of beef extracts is limited and as suitable seasonings are currently in short supply, the aforesaid demand constitutes a very important problem, especially for the makers of processed foods.

As a solution to this problem, we have succeeded in preparing, artificially, a new seasoning which is a beef-extract replacement product. This new seasoning is adapted for very wide application in the field of processed foods as a partial or complete beef-extract replacement.

Up to the present, much research has been conducted relating to determining the chemical constitutents of meat itself, the soluble components of meat and the components of beef extracts, and there is literature reporting the results of such research. Materials such as creatinine, 5'-inosinic acid, hydroxyproline and so forth are indicated in this literature to be essential to the flavor of meat. However, when we tasted a mixture of these materials, its flavor was significantly different from a beef or meat-like flavor and nowhere has it been reported that a beef or meat-like flavor can be realized by a mixture whose ingredients are certain kinds of amino acids, organic acids, phosphates and 5'-nucleotides.

Contrary to what was previously believed, when we conducted research for artificially realizing a beef or meat-like flavor and for preparing a seasoning which would contribute a beef or meat-like flavor to foods, we found that there were some kinds of amino acids which were essential to realizing a beef or meat-like flavor and that organic acids, phosphates and 5'-nucleotides were also indispensable. We have developed the present invention based on these conclusions.

Characteristic features of the present invention are as follows:

(1) Amino acids, organic acids, phosphates and 5'-nucleotides should be mixed together as essential constituents of our new seasoning which is adapted to impart a beef or meat-like flavor to foods;

(2) Alanine, histidine, arginine, threonine, methionine, leucine and glutamic acid are essential amino acids for our seasoning; we cannot prepare a seasoning which contributes beef or meat-like flavor to foods without these amino acids.

As to quantity of these amino acids, the total amount of alanine, histidine, arginine, threonine, methionine and leucine which are essential for the present seasoning should be more than 30% by weight of the total quantity of added amino acids exclusive of glutamic acid.

It is also necessary to limit the amount of organic acids to less than three parts by weight based on one part being equal to the total quantity of amino acids exclusive of glutamic acid.

We shall now explain the details of our new method and applications thereof hereinbelow.

Amino acids employable in the present method are alanine, histidine, lysine, threonine, methionine, leucine, arginine, glutamic acid, aspartic acid, glycine, isoleucine, valine, proline, serine, phenylalanine, tyrosine, tryptophan and so forth. These amino acids are necessary for providing a feeling of increased flavor body known as "mouthfullness."

Six kinds of amino acids (namely, alanine, histidine, arginine, threonine, methionine and leucine) plus the additional amino acid, glutamic acid, are especially important and essential for realizing a beef or meat-like flavor. Further, it is even more effective to employ lysine, aspartic acid, glycine, isoleucine, valine, proline, serine, phenylalanine tryptophan and tyrosine, together with the seven above-mentioned amino acids. The total amount of the six first-mentioned amino acids should be more than 30% by weight of the total quantity of all amino acids used, exclusive of the glutamic acid. When the percentage is under 30, it is almost impossible to realize a beef or meat-like flavor. The optimum percentage range is from about 40–60%.

The precise quantative balance between these six amino acids cannot be exactly determined, but according to our experiments it is desirable that the quantity of alanine employed be larger than that of any of the other amino acids. It is not necessary to employ amino acids other than the above-mentioned seven amino acids. For example, the beef or meat-like flavor of the seasoning is not influenced very much, for example, if proline and serine are excluded.

The amino acids employed in the present method are preferably of high purity in aroma, taste and color.

Generally speaking, it is not desirable to employ for our method amino acid mixtures such as soy sauce, amino acid mixtures prepared by hydrolysis of various kinds of protein and so on, because of strange odors peculiar thereto. However, refined products of these amino acid mixtures are useful as sources of amino acids to be employed in the present method. When the refined products of said amino acid mixtures are supplemented by the addition of other amino acids, we can get a mixture of suitable amino acid balance for realizing beef or meat-like flavor. Therefore, such amino acid mixtures are useful sources of amino acids for the present method, as stated above.

Organic acids are also indispensable components of our seasoning material. Such organic acids, together with amino acids and 5'-nucleotides, are especially effective for simulating more closely a total beef-extract flavor. As to these organic acids, lactic acid and succinic acid are the most effective in our seasoning, and one or more organic acids selected from the group consisting of tartaric acid, fumaric acid, malic acid, citric acid, gluconic acid, pyruvic acid, α-ketoglutaric acid and so on are also useful for our method.

The quantitative ratio between the amino acids (exclusive of glutamic acid) and the organic acids is also important in preparing the present seasoning. Specifically, the total quantity of organic acids should be limited to less than three parts by weight as free acids based on one part of amino acids. If we employ organic acids in an amount exceeding the limitation mentioned above, the acidic taste is increased and the flavor effect changes substantially from the desirable beef or meatlike flavor. Generally speaking, a range of from 0.1 to 2 parts by weight as free acid based on one part of amino acids is the most desirable range. The use of succinic acid, which provides a dimension to the flavor is desirable, but it is undesirable to employ too much succinic acid because it gives foods a shell-fish flavor.

In processes for preparing our seasoning when, for example, lactic acid in liquid form is employed together with other components, the products are usually obtained in a pasty or damp state; when, for example, we employ calcium salt of lactic acid, the products are formed in a powder state.

As to the phosphates employed in the present method, potassium, sodium or ammonium salts or phosphoric acid are typical materials effective for adding to the seasoning mouthfullness or mouth satisfaction. Organic phosphates such as phosphoethanolamine, phosphoserine, Na-glycerophosphate and β-Na-glycerophosphate have an effect similar to that of inorganic phosphates. The quantity of the above-mentioned edible phosphates should be limited to less than 0.5 part by weight calculated in terms of $P_2O_5$ based on one part of amino acids (exclusive of glutamic acid) because a larger portion of phosphate produces a strong salty taste and the minimum limit is about 0.05. The alteration of the pH value of a food by employment of those phosphates has an effect on the contributing of a beef or meat-like flavor to the food. Therefore, it is desirable to employ $KH_2PO_4$, $K_2HPO_4$, $NaH_2PO_4$, $Na_2HPO_4$, $NH_4 \cdot H_2PO_4$, $(NH_4)_2HPO_4$ or phosphates which are obtained by neutralizing phosphoric acids with NaOH, KOH, ammonia and other alkalines in order to keep the pH value of our seasoning mixtures in a range of from 4.5 to 7.5 when they are dissolved in water. This pH value has positive influence on flavor.

As to 5'-nucleotides useful for the present seasoning, these include 5'-inosinic acid, 5'-guanylic acid, 5'-adenylic acid, 5'-xanthylic acid, and so on. Of these, 5'-inosinic acid and 5'-guanylic acid are mainly employed. The quantity of 5'-nucleotides employed (calculated as free acid) should be more than 0.01 part by weight based on one part of amino acids employed in the seasoning (exclusive of glutamic acid).

Although NaCl is also a necessary component for contributing a beef or meat-like flavor to foods, it is usually unnecessary to include NaCl in our seasoning because it is already present in almost all foods.

Besides amino acids, organic acids, phosphates, 5'-nucleotides and NaCl as stated above, the use of sweetening materials (sugars, artificial sweetening materials), peptides, soluble high molecular substances (starch, gelatine, etc.), minor nitrogen-containing compounds and minerals are also effective for making the flavor of the present seasoning closer to that of meat. However, as these substances are frequently supplied as components of other seasonings or foods to which the present seasoning is applied, it is not always necessary to employ these substances.

As mentioned in detail here-in-before, the method of the present invention provides a seasoning of high quality which contributes a beef or meat-like flavor to a wide variety of food products. This seasoning is prepared very easily by mixing the above-mentioned materials which are obtainable by industrial means instead of by employing meat from animals. The present seasoning constitutes a very excellent replacement for high-grade beef extract and its flavoring effect is 3 times as strong as beef extract. With our seasoning compositions for providing a beef or meat-like flavor, we can impart such beef or meat-like flavor to many kinds of foods. By employment of the present seasoning, we can not only enhance the beef or meat-like flavor of processed foods such as sausage, ham, canned meat and bottled meat, but we can also economize on meat use by partial replacement thereof.

In accordance with this invention the powder form seasoning can be produced easily, because the various ingredients employed are presently obtained easily in crystal or powder form. The above powder seasoning is very convenient in its application to food including processed food and gives great advantage in food processing. The present seasoning is also easily produced in paste and granule forms.

In the use of this seasoning, the colors of the foods are not affected because the seasoning has practically no color of its own. It is, however, another advantage that we can easily give any color or odor to the present seasoning according to the requirements of its application.

Some detailed examples follow.

EXAMPLE 1

A seasoning composition was prepared by mixing the following materials: 15 g. of an amino acid mixture which was prepared by mixing following six amino acids: 10.43 g. of DL-alanine, 1.86 g. of L-histidine, 3.98 g. of L-leucine, 3.29 g. of L-arginine, 1.88 g. of DL-methionine and 2.58 g. of L-threonine, and 4.4 g. of monosodium glutamate monohydrate, 1.25 g. of disodium inosinate 7.5 hydrates, 16.7 g. of calcium lactate, 0.56 g. of sodium tartrate, 2.37 g. of potassium dihydrogen phosphate, 0.63 g. of disodium hydrogen phosphate 12 hydrates, 3.0 of sodium chloride and 5.0 g. of glucose.

Ten grams of the obtained mixture were added to 1.5 liters of tap water and after the pH value of the solution was adjusted to 5.1, the solution was boiled for 3 minutes. After cooling of the solution, it was offered for organoleptic test by a panel of 49 members who had been specially trained for this kind of test. As a result of above-mentioned test, 42 persons indicated that the flavor of the thusly obtained solution was very similar to that of soup obtained by boiling fresh beef.

EXAMPLE 2

A seasoning composition was prepared by mixing the following materials: 23 g. of an amino acid mixture which was prepared by mixing 20.9 g. of DL-alanine, 6.5 g. of L-arginine, 4.2 g. of monosodium L-aspartate monohydrate, 17.8 g. of monosodium L-glutamate monohydrate, 3.9 g. of glycine, 3.7 g. of L-histidine, 4.7 g. of L-isoleucine, 7.9 g. of L-leucine, 12.4 g. of L-lysine hydrochloride, 3.8 g. of DL-methionine, 5.3 g. of L-phenylalanine, 5.2 g. of L-threonine, 1.7 g. of DL-tryptophan, 5.4 g. of L-tyrosine, 7.2 g. of L-valine and 1.5 g of L-ornithine. Also included were 2.0 g. of disodium inosinate 7.5 hydrates, 33.5 g. of calcium lactate, 2.0 g. of sodium tartrate, 3.5 g. of succinic acid, 4.7 g. of potassium dihydrogen phosphate, 1.3 g. of disodium hydrogen phosphate 12 hydrates, 10 g. of glucose, 6 g. of sodium chloride, 6 g. of creatinine, 2 g. of glycine betain hydrochloride, 3.0 g. of ammonium chloride, 1.0 g. of cornstarch and 3.0 g. of lactose.

Ten grams of the thusly prepared mixture were dissolved into 1.5 liters of tap water and its pH value was adjusted to 5.0. The solution was cooled after boiling for 3 minutes (we marked the thusly obtained solution as A). We prepared 0.7%, 1.4% and 2.1% solutions of top-grade beef extracts by dissolving the beef extracts in hot water (we marked the thusly prepared solutions as B).

An organoleptic test of the similarity of flavor as between A (the concentration of included materials was 0.7% by weight) and B (the concentrations were 0.7%, 1.4% and 2.1% by weight) was performed by employing a panel of 49 members.

All members of the panel indicated the similarity of A and B and indicated that the flavor of solution A was that of beef extracts, and 47 persons of the panel also indicated that the flavor of that solution B whose concentration of included materials was 2.1% by weight, was the closest to that of solution A. It appeared, therefore, that the flavoring effect of the above-indicated seasoning composition is more than 3 times that of beef extracts.

EXAMPLE 3

A seasoning composition was prepared in almost the same way as mentioned in Example 2, but with 0.5 g. of disodium inosinate 7.5 hydrates and 0.5 g. of disodium guanylate instead of 2 g. of disodium inosinate 7.5 hydrates; also the ammonium chloride was omitted.

A 0.7% solution of the thusly obtained mixture was prepared in the same way as mentioned in Example 2 (we marked the solution as C). All members of the panel mentioned in Example 2 indicated that this solution also tasted like beef and had milder sweetness than solution A.

It was also proved by the result of the test next mentioned that the taste of the above-prepared seasoning composition was very similar to that of meat. According to such test, soup stock of beef was prepared as follows: 4 kg. of fresh beef meat (beef shank meat) were cut into small pieces and these were boiled in 1 liter of water for 1.5 hours and then filtered with gauze (the filtrate was 800 ml.). As a result of a panel test, all members of a panel (20 members) indicated a very close similarity of flavor between the artificially prepared seasoning composition and the above-mentioned soup stock.

EXAMPLE 4

A seasoning composition was prepared as follows: 30 g. of an amino acid mixture which was prepared by mixing and grinding to powder 6.2 g. of DL-alanine, 3.9 g. of monosodium L-aspartate monohydrate, 4.1 g. of monosodium L-glutamate monohydrate, 1.4 g. of glycine, 1.1 g. of L-histidine, 1.4 g. of L-isoleucine, 2.5 g. of L-leucine, 4.2 g. of L-lysine hydrochloride, 1.1 g. of DL-methionine, 0.38 g. of L-phenylalanine, 1.7 g. of L-proline, 1.3 g. of L-serine, 0.78 g. of L-threonine, 0.91 g. of L-tyrosine and 2.1 g. of L-valine. Also included were 2.5 g. of disodium inosinate 7.5 hydrates, 33.5 g. of calcium lactate, 1.1 g. of sodium tartrate, 4.5 g. of succinic acid, 4.7 g. of potassium dihydrogen phosphate, 1.3 g. of disodium hydrogen phosphate 12 hydrates, 10 g. of glucose, 3 g. of ammonium chloride, 6 g. of sodium chloride, 3 g. of cornstarch and 1 g. of lactose were mixed together and ground to powder.

We prepared meat sausage by adding 8 g. of the above-prepared mixture to 1.5 kg. of sausage raw materials at the beginning of preparation of the sausage and we also prepared meat sausage for the sake of comparison by adding only 5 g. of monosodium L-glutamate.

We performed a preference test in connection with the flavor of the sample sausage prepared by adding the above-mentioned mixture and the comparison sausage. We got the result that 25 persons of a panel (whose members totaled 33) preferred the flavor of the sample sausage to that of the comparison sausage.

EXAMPLE 5

Gravy sauce (sauce of roast beef) was prepared as follows: 400 ml. of water, 15 g. of sodium chloride, 4 g. of cornstarch and a small amount of spice were added to 30 g. of commercial beef extracts of high grade and the mixture was boiled for 5 minutes with agitation. We marked the thusly obtained gravy sauce as A. We also prepared gravy sauce by employing 15 g. of seasoning composition prepared in Example 4 instead of 30 g. of the above-mentioned commercial beef extracts. We marked this gravy sauce as B.

We performed organoleptic tests by employing a panel of 27 members in connection with the flavor of the above-prepared gravy sauces A and B. As a result of the difference test, there was no significant difference found between A and B. We also got the result that there was no significant difference between A and B as a result of preference test; namely, 15 persons indicated that A was more preferable, but 12 persons preferred B more than A.

EXAMPLE 6

We prepared three different kinds of soup as follows:
(A) One kilogram of fresh beef meat (beef shank meat) which was cut into small pieces was boiled with 4 liters of tap water. To the thusly obtained broth, 250 g. of fresh onions, 100 g. of fresh carrot, 100 g. of fresh celery, 50 g. of fresh stone-leek, a leaf of laurel (ivy) tree and 0.5 g. of pepper were added and the resulting preparation was boiled down for 2 hours with a weak flame. The thusly obtained broth was filtered and 14 g. of NaCl were added to the broth. Thus 2 liters of soup were obtained. (We marked this soup as A.)

(B) We prepared 2 liters of soup B of almost the same composition, but employing only 200 g. of beef meat.

(C) Soup C was prepared by adding 3.5 g. of the seasoning composition which was prepared in Example 2 to soup B and heating it for 5 minutes.

We preformed or organoleptic test with a panel of 28 members who had been specially trained for this kind of test. As a result of comparison of the flaror between these 3 kinds of soup, the panel members indicated as follows:

(1) All members of the panel indicated that soup A was a meat identity, but that soup B had a vegetable flavor.

(2) 26 members of the panel indicated that the soup C had more of a beef or meat-like flavor than soup B.

(3) When the flavor effects of soup A and soup C were examined, 15 of the panel preferred soup A and 12 of the panel preferred soup C.

Therefore, it has appeared that the seasoning composition of the invention is extremely useful as a substitute for meat.

EXAMPLE 7

A dry soup was prepared by mixing the following materials: 35 g. of beef fat, 5.5 g. of sage-thyme-pepper, 2.5 g. of garlic powder, 3.0 g. of carrot powder, 2.0 g. of caramel color, 40.0 g. of beef extract, 44 g. of sugar, 180 g. of salt, 1.0 g. of onion powder, 35 g. of monosodium glutamate and 50 g. of commercial hydrolyzed vegetable protein (the thusly prepared dry soup is for contrast); another soup was also prepared in almost the same way as mentioned above but employing 12 g. of beef-extract instead of the above said 40 g. and also employing 9 g. of the present seasoning powder prepared by the method mentioned in Example 2 (the thusly prepared dry soup is for the test sample).

45 g. of each dry soup were dissolved in 2 liter of hot water. The obtained soups were offered for difference test by triangle method organoleptically by the 49 persons mentioned in Example 2. Only 18 persons of the panel could answer correctly. Therefore, we found no significant difference between the contrast soup and the sample soup.

A test of the quality of these soups was performed by 5 expert evaluation panels and they indicated that there were no differences at all in the quality of these two kinds of soups.

EXAMPLE 8

Mutton was cut into slices about 0.7 cm. thick and smeared on both sides with the seasoning material prepared by the method described in Example 4 at a rate of 0.4 percent to the meat. The mutton was then salted with 0.5 percent NaCl and kept for 3 hours at 5° C. Almost the same degree of roasting was effected on both sides of the meat with an oiled iron plate on a gas range. At the time, an aroma of roasted beef was perceived. By the organoleptic judgments of 5 specialized taste panels, it was proved that the flavor of the cooked mutton was very similar to that of beef.

What is claimed is:

1. A method of preparing a seasoning for use as a beef-extract replacement or flavor enhancer comprising mixing a first ingredient consisting of amino acids including glutamic acid, a second ingredient consisting of at least one organic acid selected from the group consisting of lactic acid, succinic acid, tartaric acid, citric acid, fumaric acid, malic acid, gluconic acid, pyruvic acid and α-ketoglutaric acid, said organic acid being present in about 0.1 to 3 parts by weight as free acid based on one part of amino acid exclusive of the glutamic acid, a third ingredient consisting of at least one edible phosphate, and a fourth ingredient consisting of at least one 5′ nucleotide to form a seasoning composition, said amino and organic acids being selected from the group consisting of free acids, salts of the acids, and mixtures thereof, said first ingredient including glutamic acid and a group of amino acids consisting of alanine, histidine, arginine, threonine, methionine and leucine, said group being in an amount exceeding 30% by weight of the total amount of amino acids exclusive of glutamic acid, said third ingredient being present in an amount sufficient to establish a pH range in the seasoning of about 4.5 to 7.5, the fourth ingredient being in an amount of at least .01 part by weight based on one part of amino acids exclusive of glutamic acid.

2. A method as claimed in claim 1, wherein the organic acid is in the amount of 0.1 to 2 parts, based on weight of free organic acid, to said one part of amino acids exclusive of the glutamic acid.

3. A method as claimed in claim 1, wherein the fourth ingredient is selected from the group consisting of 5′-inosinic acid, 5′-guanylic acid, 5′-adenylic acid, 5′-xanthylic acid and mixtures thereof.

4. A method as claimed in claim 1, wherein the third ingredient is phosphate in an amount which is no more than 0.5 part by weight, calculated in terms of $P_2O_5$, to one part of all amino acids employed exclusive of glutamic acid.

5. A method as claimed in claim 1, wherein the said group of amino acids constitutes about 40–60% of the total weight of amino acids employed exclusive of the glutamic acid.

6. A method as claimed in claim 1, comprising further employing amino acids from the group consisting of lysine, aspartic acid, glycine, isoleucine, valine, proline, serine, phenylalanine and tyrosine.

7. A method as claimed in claim 1, wherein the organic acid is a carboxylic acid having at least two oxygen atoms.

8. A method as claimed in claim 1, wherein said organic acid is employed in liquid form to obtain a pasty composition.

9. A method as claimed in claim 1, wherein said organic acid is employed in dry form to obtain a powder composition.

10. A method as claimed in claim 1, comprising adding sweetening material, peptides, soluble high molecular substances, nitrogen containing compounds and minerals into the composition.

11. A method of enhancing the flavor of or imparting a beef-like flavor to a food comprising adding the composition prepared according to claim 1 to said food in an amount to enhance the flavor thereof or impart a beef-like flavor thereto.

12. A method as claimed in claim 11 comprising adding the composition to a procesed food.

13. A method as claimed in claim 12, wherein the food consists at least in part of meat.

14. A method as claimed in claim 2, wherein the seasoning composition is substituted at least in part for meat.

15. A method as claimed in claim 4, wherein said phosphate is at least one phospate selected from the group consisting of inorganic phosphates, phosphoethanolamine, phosphoserine, Na-glycerophosphate, and β-Na-glycerophosphate.

16. A method as claimed in claim 12, wherein the seasoning composition is substituted at least in part for beef extract.

17. A seasoning composition for use as a beef-extract replacement or flavor enhancer comprising a first ingredient of amino acids including glutamic acid, a second ingredient of at least one organic acid selected from the group consisting of lactic acid, succinic acid, tartaric acid, citric acid, fumaric acid, malic acid, gluconic acid, pyruvic acid and α-ketoglutaric acid, said organic acid being present in about 0.1 to 3 parts by weight as free acid based on one part of amino acids exclusive of the glutamic acid, a third ingredient of at least one edible phosphate, and a fourth ingredient of at least one 5′-nucleotide, said amino and organic acids being selected from the group consisting of free acids, salts and mixtures thereof; said first ingredient including glutamic acid and a group of amino acids consisting of alanine, histidine, arginine, threonine, methionine and leucine, said group being in an amount exceeding 30% by weight of the total amount of amino acids, employed exclusive of the glutamic acid; the third ingredient being in an amount which is no more than 0.5 part by weight, calculated in terms of $P_2O_5$, to one part of amino acids exclusive of glutamic acid; and the fourth ingredient being in an amount which is more than 0.01 part by weight based on one part of amino acids exclusive of glutamic acid.

18. A composition as claimed in claim 17, further comprising amino acids from the group consisting of lysine, aspartic acid, glycine, isoleucine, valine, proline, serine, phenylalanine tryptophan and tyrosine.

19. A product comprising a food and, in seasoning quantity, a seasoning composition comprising in intimate mixture a first ingredient of amino acids, a second ingredient including at least one organic acid selected from the group consisting of latic acid, succinic acid, tartaric acid, citric acid, fumaric acid, malic acid, gluconic acid, pyruvic acid and α-ketoglutaric acid, a third ingredient consisting of at least one edible phosphate, and a fourth ingredient including at least one 5′-nucleotide, said composition comprising acids in a form selected from the group consisting of free acids, salts and mixtures thereof; said first ingredient including glutamic acid and a group of amino acids consisting of alanine, histidine, arginine, threonine, methionine and leucine, said group being in an amount exceeding 30% by weight of the total amount of amino acids employed exclusive of the glutamic acid; said second ingredient comprising organic acid in an amount necessary to cooperate with the other of the ingredients for simulating a beef-extract flavor but in an amount of no more than three parts by weight based on weight of free acid to one part of all amino acids employed exclusive of the glutamic acid; said third ingredient comprising phosphate in an amount which is no more than 0.5 part by weight, calculated in terms of $P_2O_5$, to one part of amino acid, exclusive of glutamic acid; and the fourth ingredient being in an amount which is more than 0.01 part by weight based on one part of amino acid, exclusive of glutamic acid.

20. A product as claimed in claim 19, wherein said first part further comprises amino acids from the group consisting of lysine, aspartic acid, glycine, isoleucine, valine, proline, serine, phenylalanine, tryptophan and tyrosine.

21. An artificial seasoning composition comprising: (1) a first ingredient of amino acids including glutamic acid and a group of amino acids consisting of alanine, histidine, arginine, threonine, methionine and leucine, said group being in an amount exceeding 30% by weight of the total amount of amino acids employed exclusive of the glutamic acid, (2) a second ingredient of at least one organic acid in an amount necessary to cooperate with the other of the ingredients for simulating a beef-extract flavor but in an amount of no more than three parts by weight, based on weight of free organic acid, to one part of all amino acids employed exclusive of the glutamic acid, said organic acid being selected from the group consisting of lactic acid, succinic acid, tartaric acid, citric acid, fumaric acid, malic acid, gluconic acid, pyruvic acid and α-ketoglutaric acid, (3) a third ingredient of at least one edible phosphate, and (4) a fourth ingredient of at least one 5'-nucleotide, said third ingredient being present in an amount sufficient to establish a pH range in the seasoning of about 4.5 to 7.5, the fourth ingredient being in an amount of at least .01 part by weight based on one part of amino acids exclusive of glutamic acid.

References Cited

UNITED STATES PATENTS 3,326,697    6/1967    Shimazono et al.

OTHER REFERENCES

Chemical Abstracts, vol. 64, 1966, pp. 8855(e)(f).

A. LOUIS MONACELL, Primary Examiner

W. BOVEE, Assistant Examiner